United States Patent [19]

Evenson

[11] Patent Number: 4,484,661

[45] Date of Patent: Nov. 27, 1984

[54] DRIP PAN FOR VEHICLES

[76] Inventor: John L. Evenson, 425-15th St. East, Willmar, Minn. 56201

[21] Appl. No.: 482,930

[22] Filed: Apr. 7, 1983

[51] Int. Cl.³ .......................... F16N 31/00; B65G 1/14
[52] U.S. Cl. ..................................... 184/106; 206/504; 220/1 C
[58] Field of Search ................ 184/106, 1.5; 206/504, 206/506; 220/234, 236, 1 C; 108/53.3, 56.1

[56] References Cited

U.S. PATENT DOCUMENTS

| | | | |
|---|---|---|---|
| 1,530,725 | 3/1925 | Johannesmeyer et al. | 407/223 |
| 2,064,518 | 12/1936 | Brogden | 206/504 |
| 2,934,003 | 4/1960 | Ladymon | 184/106 X |
| 3,044,575 | 7/1962 | Minutillo | 184/106 |
| 3,284,273 | 11/1966 | Prentice | 184/106 X |
| 3,343,706 | 9/1967 | Berend | 220/23.4 |
| 3,734,309 | 5/1973 | Bateman | 206/504 |
| 3,811,566 | 5/1974 | Bateman | 206/504 X |
| 3,834,527 | 9/1974 | Howe | 206/494 |
| 3,857,342 | 12/1974 | Johns | 108/53.3 |
| 3,857,482 | 12/1974 | Shelton | 206/72 |
| 3,908,828 | 9/1975 | Lohwasser | 206/504 |
| 4,069,941 | 1/1978 | Popplewell, Jr. | 220/23.4 |
| 4,246,982 | 1/1981 | Pretnick | 184/106 |
| 4,315,561 | 2/1982 | Partridge | 184/106 |

Primary Examiner—David H. Brown
Attorney, Agent, or Firm—Kinney & Lange

[57] ABSTRACT

A drip pan for vehicles is made so that it can be used individually or assembled with other identical pans in an array to catch drippings from automobiles or trucks when they are parked. The pans have relatively low walls because the volume of dripping is not substantial, and when made of suitable plastic the pans can be driven over without damaging them. At least one end and one side of the pan are provided with a curved overhanging lip, the outer end of which will overlap the upper edges of walls of another pan which do not have such a lip, so that an array of pans can be formed to cover a large area if desired. The assembly of pans together is easily done and the drippings that normally fall in the junction area between pans are divided by the lips into one or the other of the pans so that the floor is not soiled.

5 Claims, 5 Drawing Figures

DRIP PAN FOR VEHICLES

BACKGROUND OF THE INVENTION

1. Field of the Invention

The present invention relates to drip pans for use under motor vehicles.

2. Description of the Prior Art

Various pan constructions have been advanced in the prior art to solve the problem of oil and grease dripping from motor vehicles onto garage floors. For example, a low drip pan is shown in U.S. Pat. No. 3,044,575 which is specifically a wide garage drip pan of unitary construction that is made to catch drippings from motor vehicles. An absorbent pad for catching drips is shown in U.S. Pat. No. 3,284,273. A disposable oil drip pan is shown in U.S. Pat. No. 3,834,527. These various pans are of conventional designs and are single pans merely placed below the vehicle and as single pans catch the drippings.

U.S. Pat. No. 4,246,982 shows a car ramp and drip pan assembly which has a ramp member to permit a car to drive over a wall and into the pan. In FIGS. 5 and 6 this patent shows that the ramps themselves can be hooked onto the pan, so the car or vehicle is driven into the pan directly.

The concept of having different pan constructions which have interlocking and partially overlapping lips on their edges is shown in an interlocking tray in U.S. Pat. No. 3,734,309. The trays are serving trays for airline use, and are not concerned with catching drips. The lips are overlapped for one half of the length of the wall only.

Card racks that form a type of pan or receptacle and which have overlapping lip sections are shown in U.S. Pat. No. 4,069,941 and overlapping display trays are shown in U.S. Pat. No. 3,857,482.

U.S. Pat. No. 3,343,706 shows a multiple part drawer divider which has overlapping flanges on one side that permits locking the drawer dividers together.

U.S. Pat. No. 4,315,561 shows a drip pan for radiators and cooling systems which is mounted on casters and has internal partitions. It has an edge lip all the way around, and does not indicate or suggest in any way the ability to overlap the lips.

Additional patents that show the state of the art for various trays include the following:

U.S. Pat. Nos. 1,530,725, 2,934,003, and 3,857,342.

SUMMARY OF THE INVENTION

The present invention relates to a drip pan for use in garages which is modular and has provisions to permit one or more of the pans to be used for catching drippings from vehicles. The pans are low, that is they have low side walls so that they can be driven over and when made of a suitable resilient or tough plastic material, no damage to the pans will result. Additionally, the pans are made so that one of the side walls and one of the end walls (the pans are made in a rectangular configuration) have an internal lip which forms an overlapping portion to overlap the lower sides or ends of additional pans when the units are made into a larger assembly using the individual pans.

The pans are selected to be of a suitable size so that they will be easily stored and handled when not needed and for displays and shipping, but can be assembled into multiples to provide a large area for catching drips across the width of large trucks, or automobiles, or substantially any size area. The overlapping lips are made so that the amount of exposed surface that might not be covered in an assembly is minimized. The pans can be easily molded in suitable plastic and are low cost and simple to store and use.

DETAILED DESCRIPTION OF THE PREFERRED EMBODIMENT

Figure 1:
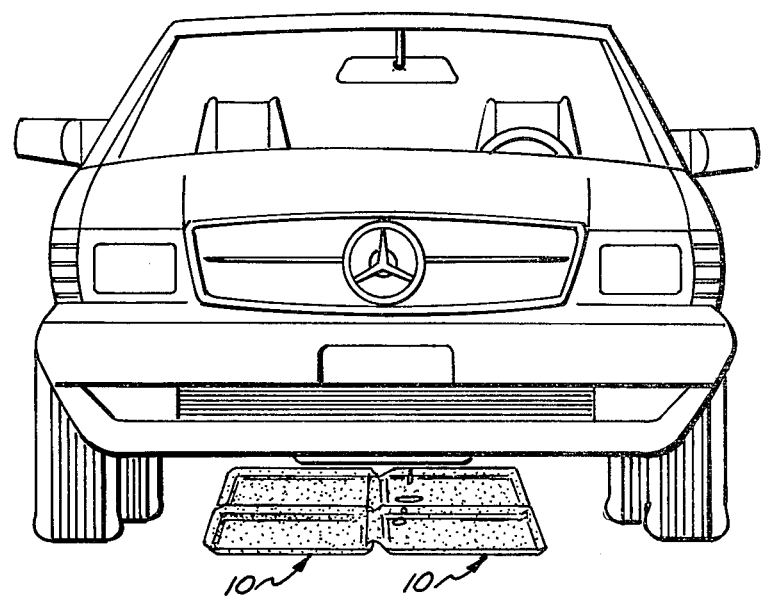
FIG. 1 is a front view of an automobile in a garage and an assembly of drip pans made according to the present invention in place under the automobile.
Figure 3:
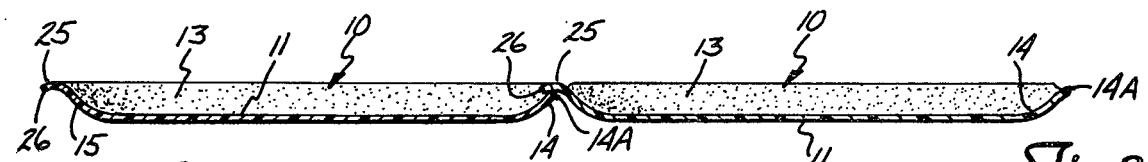
FIG. 3 is a sectional view taken along 3—3 in FIG. 2.
Figure 5:
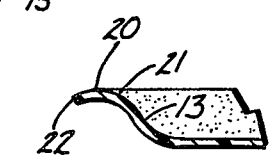
FIG. 5 is a fagmentary vertical sectional view of the end wall having a lip thereon.
Figure 2:
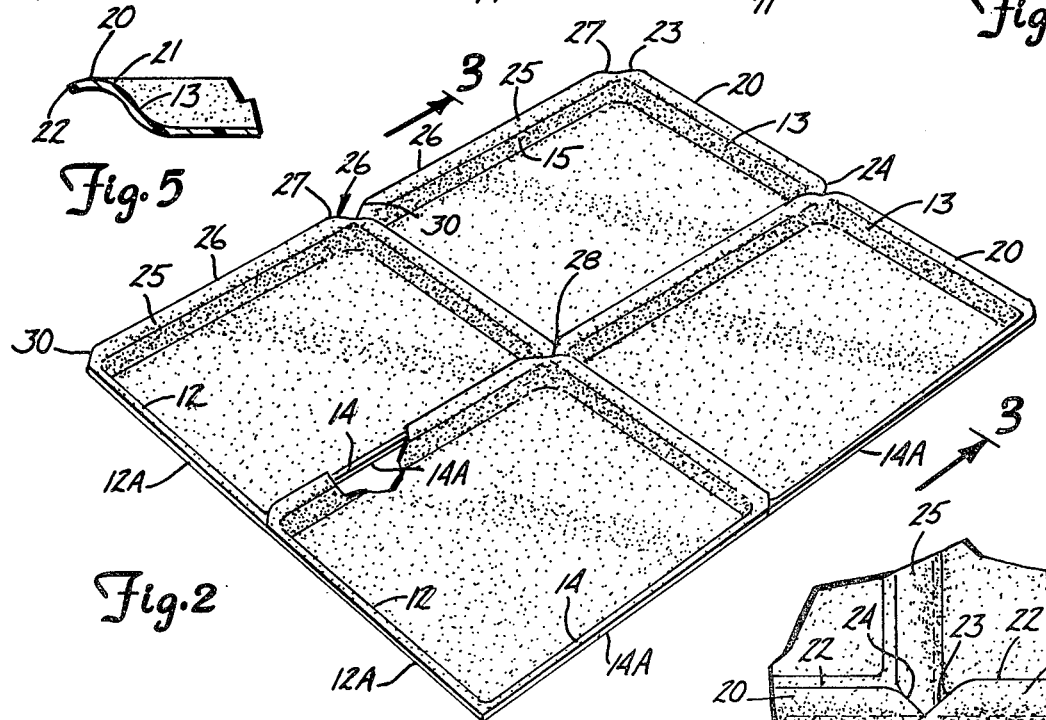
FIG. 2 is a top perspective view of pans made according to the present invention shown assembled so that the modular pans are made to form one large area for catching drips.
Figure 4:
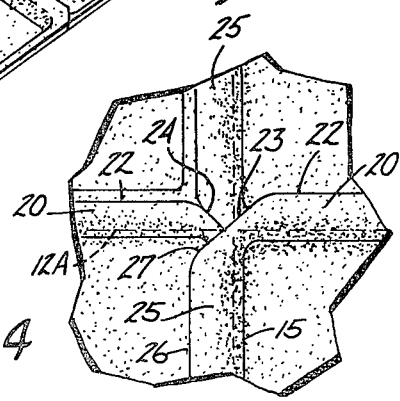
FIG. 4 is an enlarged detail of the corner junction between four pans.

A modular drip pan illustrated generally at 10, comprises a unitary molded pan having a bottom wall 11, a first end wall 12, a second end wall 13, a first side wall 14, and a second side wall 15. The walls 12 and 14 are relatively low walls that terminate along a plane, and extend generally at a slope uprightly from the bottom wall and end in a narrow edge shown at 12A and 14A. The pans as shown are rectilinear in plan configuration, and actually form a rectangle, although they could be square or other rectilinear plan shapes.

The walls 13 and 15 as shown slope upwardly like the walls 12 and 14, but at the upper end the wall 13 has an integral curved lip member 20 that extends outwardly from the outer upright surface 21 of the wall 13, and this lip member is gently curved in a convex shape and has an outer edge 22 that curves downwardly slightly from the crown of the lip. The convex shape can be seen in cross section. The lip member 20 has an upwardly surface that provides for draining, much like a roof. The lip edge portion 22 terminates on a level slightly below the plane or level of the upper edge of the walls 14 and 12. The ends 23 and 24 of the lip 20 taper at an angle so that the outer edge 22 is not as long as the junction edge between the upright wall 13 and the inner edge of the lip 20. This beveling of the corners is for reducing the likelihood of interference when placing the units into an array.

The side wall 15 also has a curved convex or arched lip member 25 integral therewith. The lip 25 is longer than the lip 20 and extends along one longitudinal side of the pan. The lip 25 has an outer edge 26 which also curves downwardly from the high point. The end 27 of the lip 25 adjacent the lip 20 of the same pan is tapered or trimmed at an angle and relief space 28 is formed between the adjacent ends of the two lips on the same pan. The end 27 tapers so that the outer edge 26 of lip 25 is of shorter length than the junction between the lip 25 and the wall 15. The opposite end 30 of the lip 25 tapers as well for clearance purposes.

The pan 10 is a modular pan in that a plurality of such pans can be assembled into a suitably sized array of pans. The outer edges 22 and 26 of the convex, arched lips 20 and 25 are of height above the bottom wall so that they will slip over the upper edges 12A and 14A of the walls 12 and 14, respectively, of adjacent modular pans 10. The lips form an arched overhang or overlap to the adjacent pan. The edges 22 and 26 actually overlie and terminate above the interior of an adjacent pan 10.

The modular units are made so that edges of the lips terminate slightly below the edges of the walls 12 and 14 so that the lips extend into the adjacent pan a bit and tend to hold the adjacent pans together. At the same time any drips that strike the convex, arched upper surface of the lips will be drained into one or the other of the pans so that no drippings, such as oil, grease or dirt will contact the garage floor or other floor being protected.

Note that an array of a number of pans can be made, and each of the individual pans is molded of a suitable high impact plastic, or other suitable material so that the pans can be driven over without substantially damaging them. In other words they are not a plastic that will crack, but actually one that will yield slightly or carry the weight of an automobile or truck is desired. An example would be a foamed polystyrene such as that used for molded pans used for vegetables and meat at the present time.

By having the lips on two walls only (one end and one side), and having the other two walls terminating along narrow edges, the assembly of the pans can be easily made. The tapered or beveled ends 23, 24, 27 and 30, respectively, provided for lateral adjustment of the pans and clearance necessary for forming the array without exposing any substantial area of the floor to drippings. In fact, a very small portion of the total space is left exposed because of the arrangement of the lips on one end and one side of the pan that overlap a nonlipped side and end of adjacent pans.

The pans can be made relatively small for individual use, such as for example, two feet by three feet or so, and then joined together to form a pan that covers a substantial area if necessary for catching drips across the entire width of an automobile or large truck.

Although the present invention has been described with reference to preferred embodiments, workers skilled in the art will recognize that changes may be made in form and detail without departing from the spirit and scope of the invention.

What is claimed is:

1. A drip pan for vehicles comprising a modular pan structure formed of a suitable material including a bottom wall, and peripheral walls attached to the bottom wall and formed into a generally rectilinear shape, said peripheral walls comprising a pair of spaced end walls, and a pair of spaced side walls joined to the end walls;
   a first of said walls and an adjacent one of said side walls terminating along a plane to form narrow edges defined by the thickness of such walls;
   a second of said end walls and a second of said side walls opposite from the first mentioned end and side walls, respectively, each having an arched lip formed thereon which extends outwardly from the wall and has a convex curved upper surface so that the outer edge of the lip extends laterally outwardly from the wall to which it is attached and turns downwardly slightly; and
   said lips being of sufficient size so that they may be placed over the first mentioned end and side walls of other pans to form a modular pan unit with the gap between the pans along the first mentioned edge and side walls of such other pans covered by the lips of a first pan.

2. The drip pan of claim 1 wherein the lips of the second end wall and second side wall are adjacent each other at a corner of the pan, and said lips being tapered adjacent said corner to form a shorter length at the outer edges of the lips to form an open space to permit the lips of one pan to be overlapped over the edges of another pan.

3. The pan of claim 1 wherein said pan is formed of a molded plastic material that is resistant to permanent deformation under load.

4. The pan of claim 1 wherein said lip on the second side wall is longer than the lip on the second end wall, and the ends of the lips are both tapered to form a shorter length of lip at their respective outer edges.

5. The drip pan of claim 1 wherein the lips both have end edges that are tapered from the walls of the pan outwardly so that the outer edges of each of the lips are shorter than the edge of the respective lip joining the respective side and end walls, and wherein the outer edges of the arched lips terminate slightly below the plane along which the first end wall and first side wall of the pan terminate.

* * * * *